US00RE45957E

(19) United States
(12) Reissued Patent
Ye et al.

(10) Patent Number: US RE45,957 E
(45) Date of Reissued Patent: Mar. 29, 2016

(54) REGENERATIVE RING RESONATOR

(71) Applicant: Cymer, LLC, San Diego, CA (US)

(72) Inventors: Hong Ye, San Diego, CA (US); Richard L. Sandstrom, Encinitas, CA (US); Rostislav Rokitski, La Jolla, CA (US); Daniel J. W. Brown, San Diego, CA (US); Robert J. Rafac, Encinitas, CA (US)

(73) Assignee: Cymer, LLC, San Diego, CA (US)

(21) Appl. No.: 13/786,795

(22) Filed: Mar. 6, 2013

Related U.S. Patent Documents

Reissue of:
(64) Patent No.: 8,014,432
Issued: Sep. 6, 2011
Appl. No.: 12/724,681
Filed: Mar. 16, 2010

U.S. Applications:
(63) Continuation-in-part of application No. 12/413,341, filed on Mar. 27, 2009, now abandoned.

(60) Provisional application No. 61/164,297, filed on Mar. 27, 2009.

(51) Int. Cl.
*H01S 3/22* (2006.01)
*H01S 3/08* (2006.01)
(Continued)

(52) U.S. Cl.
CPC ..... *H01S 3/08072* (2013.01); *H01S 3/10092* (2013.01); *H01S 3/235* (2013.01); *H01S 3/036* (2013.01); *H01S 3/0835* (2013.01)

(58) Field of Classification Search
CPC ..... H01S 3/08072; H01S 3/0835; H01S 3/10092; H01S 3/235
USPC ..... 372/55, 61, 95, 99, 100, 94, 108
See application file for complete search history.

(56) References Cited

U.S. PATENT DOCUMENTS 5,023,884 A 6/1991 Akins
5,557,630 A 9/1996 Scaggs
(Continued)

FOREIGN PATENT DOCUMENTS

JP 10-303480 11/1998
JP 2006-203008 A 8/2006
(Continued)

OTHER PUBLICATIONS

Cymer Inc., "An Introduction to Ring Technology: Bringing 45 nm Photolithography to Production", White Paper, San Diego, CA,(2006),7 pages.
(Continued)

*Primary Examiner* — James Menefee
(74) *Attorney, Agent, or Firm* — DiBerardino McGovern IP Group LLC

(57) ABSTRACT

A laser includes a regenerative ring resonator that includes a discharge chamber having electrodes and a gain medium between the electrodes for producing a laser beam; a partially-reflective optical coupler, and a beam modification optical system in the path of the laser beam. The beam modification optical system transversely expands a profile of the laser beam such that the near field laser beam profile uniformly fills each aperture within the laser and such that the regenerative ring resonator remains either conditionally stable or marginally unstable when operating the laser at powers that induce thermal lenses in optical elements inside the regenerative ring resonator.

35 Claims, 15 Drawing Sheets

(51) Int. Cl.

| | |
|---|---|
| ***H01S 3/10*** | (2006.01) |
| ***H01S 3/23*** | (2006.01) |
| *H01S 3/036* | (2006.01) |
| *H01S 3/083* | (2006.01) |

(56) References Cited

U.S. PATENT DOCUMENTS

| | | | | |
|---|---|---|---|---|
| 5,970,082 | A | 10/1999 | Ershov | |
| 6,356,576 | B1 | 3/2002 | Smith | |
| 6,496,528 | B2 | 12/2002 | Titus | |
| 6,693,939 | B2 | 2/2004 | Klene | |
| 6,904,073 | B2 | 6/2005 | Yager | |
| 7,061,961 | B2 | 6/2006 | Knowles | |
| 7,087,914 | B2 | 8/2006 | Akins | |
| 7,088,758 | B2 | 8/2006 | Sandstrom | |
| 7,154,928 | B2 | 12/2006 | Sandstrom | |
| 7,184,204 | B2 | 2/2007 | Govorkov | |
| 7,227,881 | B2 | 6/2007 | Govorkov | |
| 7,230,964 | B2 | 6/2007 | Das | |
| 7,366,219 | B2 | 4/2008 | Algots | |
| 8,014,432 | B2 | 9/2011 | Ye et al. | |
| 2004/0066828 | A1 | 4/2004 | Tamaki et al. | |
| 2004/0202220 | A1 | 10/2004 | Hua et al. | |
| 2005/0174576 | A1 | 8/2005 | Rao | |
| 2007/0019701 | A1 | 1/2007 | Sherstobitov et al. | |
| 2007/0091968 | A1 | 4/2007 | Wakabayashi | |
| 2007/0297483 | A1 | 12/2007 | Wakabayashi | |
| 2008/0117948 | A1* | 5/2008 | Wakabayashi | 372/57 |
| 2008/0144671 | A1 | 6/2008 | Ershov | |
| 2008/0165337 | A1 | 7/2008 | Ershov | |
| 2008/0225904 | A1 | 9/2008 | Brown | |
| 2008/0225908 | A1 | 9/2008 | Ershov | |
| 2008/0267241 | A1 | 10/2008 | Brown | |
| 2008/0267242 | A1 | 10/2008 | Ershov | |
| 2009/0067468 | A1 | 3/2009 | Brown | |
| 2010/0074295 | A1* | 3/2010 | Partlo et al. | 372/55 |
| 2011/0058580 | A1* | 3/2011 | Sandstrom et al. | 372/38.05 |
| 2012/0002687 | A1* | 1/2012 | Ershov et al. | 372/20 |

FOREIGN PATENT DOCUMENTS

| | | |
|---|---|---|
| JP | 2008103604 | 1/2008 |
| WO | 2007053335 | 5/2007 |

OTHER PUBLICATIONS

"Written Opinion of the International Searching Authority", Authorized Officer Blaine R. Copenheaver, mailed May 17, 2010, in related application PCT/US2010027842, 5 pages.

Notification of Reasons for Refusal in counterpart application, JP Application No. 2012-502124, Japan Patent Office, Jan. 29, 2014, 5 pages.

Official Letter with Search Report, from Taiwan Patent Office, in counterpart Taiwanese Patent Application 99109123, mailed Jan. 21, 2015, 8 pages.

Notification of Reasons for Refusal (with translation), from Japanese Patent Office, in counterpart Japanese Patent Application 2012-502124, mailed Jan. 7, 2015, 8 pages.

Official Letter with Search Report with translation of relevant portions, from Taiwan Patent Office, in counterpart Taiwanese Patent Application 99109123, mailed Jan. 21, 2015, 8 pages.

Notification of Grounds for Refusal, from Korean Intellectual Property Office, in counterpart Korean Patent Application 10-2011-7025233, mailed Apr. 20, 2015, 11 pages, with English Translation.

Supplemental European Search Report, issued by Examiner Stefan Riechel, in counterpart European Patent Application No. 10756630.9, mailed May 28, 2015, 7 pages including extended European search report and European search opinion.

Notice of Reasons for Rejection, issued by Examiner Tadashi Kawahara, in counterpart Japanese Patent Application No. 2012-502124 mailed Dec. 3, 2015, 13 pages including English translation.

"International Search Report by the International Searching Authority", Authorized Officer Blaine R. Copenheaver, mailed May 17, 2010, in related application PCT/US2010/027842, 2 pages.

* cited by examiner

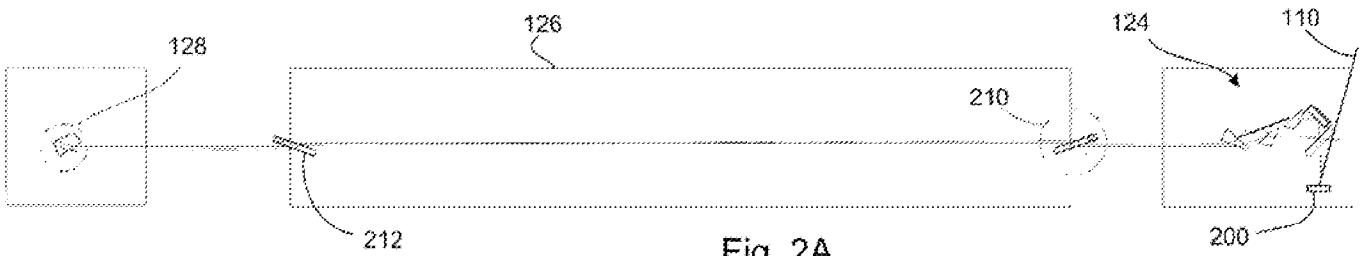
Fig. 2A
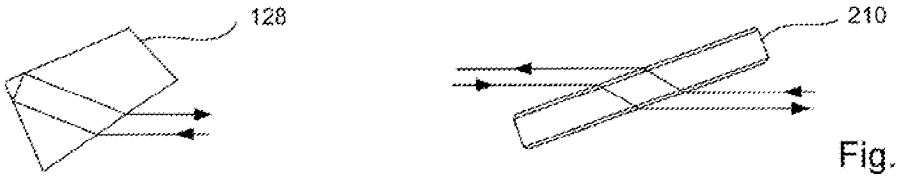
Fig. 2B
Fig. 2C
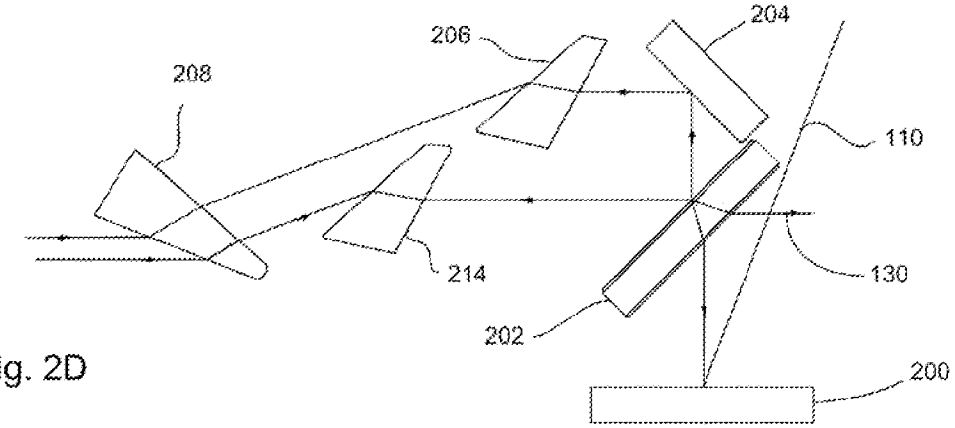
Fig. 2D

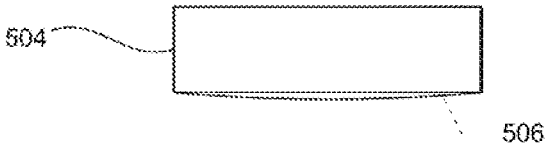
Fig. 8B
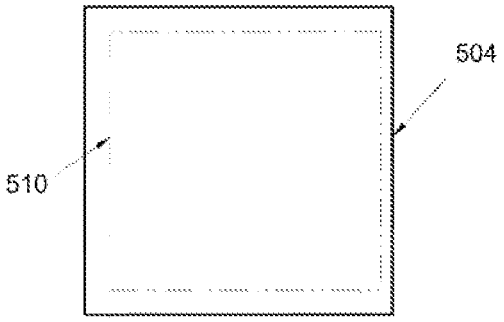
Fig. 8A
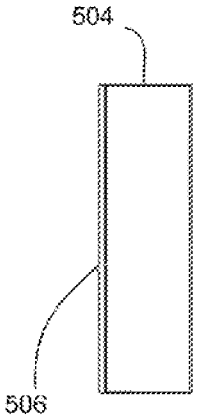
Fig. 8C
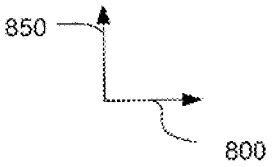

Fig. 12B
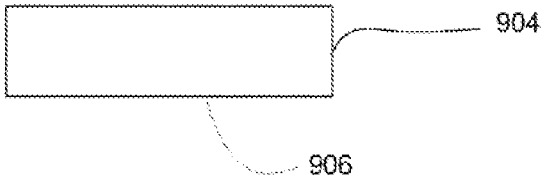
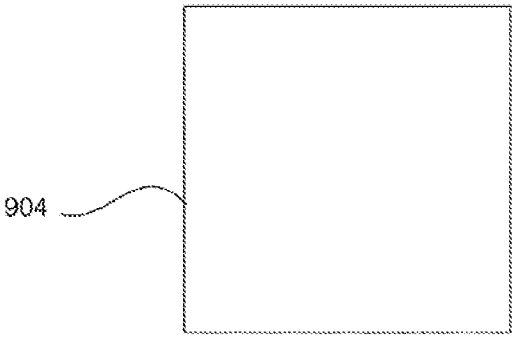
Fig. 12A
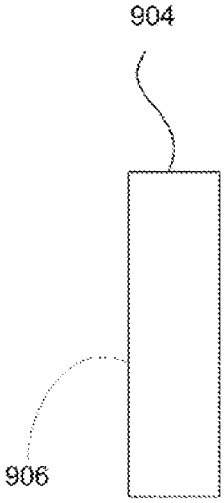
Fig. 12C

REGENERATIVE RING RESONATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation-in-part of U.S. application Ser. No. 12/413,341, filed Mar. 27, 2009 and also claims the benefit of U.S. Provisional Application No. 61/164,297, filed Mar. 27, 2009. Both of these applications are herein incorporated by reference in their entirety.

TECHNICAL FIELD

The disclosed subject matter relates to a recirculating ring resonator of a high power laser system such as a gas discharge laser.

BACKGROUND

Gas discharge lasers are used in photolithography to manufacture semiconductor integrated circuits. As semiconductor manufacturing has progressed to requiring smaller and smaller feature sizes (that is, the minimum feature size used to fabricate the integrated circuit), the design and performance of these lasers has improved. For example, gas discharge lasers have been redesigned to provide shorter wavelength and narrower bandwidth to support higher resolution, to provide higher powers to enable higher throughput, and to stabilize performance parameters such as dose, wavelength, and bandwidth.

Excimer lasers are one type of gas discharge laser used in photolithography that can operate in the ultraviolet (UV) spectral region at high average output power to generate nanosecond pulses at reduced spectral bandwidth.

In some cases, these lasers are designed with a dual chamber design having first and second chambers to separate the functions of providing narrow spectral bandwidth and generating high average output pulse energy. The first chamber is called a master oscillator (MO) that provides a seed laser beam and the second chamber is called a power amplifier (PA), a power oscillator (PO), or a power ring amplifier (PRA) and receives the seed laser beam from the MO. The MO chamber enables fine tuning of parameters such as the center wavelength and the bandwidth at relatively low output pulse energies. The power amplifier receives the output from the master oscillator and amplifies this output to attain the necessary powers for output to use in photolithography. The dual chamber design can be referred to as a MOPA, MOPO, or MOPRA, depending on how the second chamber is used.

SUMMARY

In some general aspects, a laser includes a regenerative ring resonator that includes an amplifier discharge chamber having electrodes and a gain medium between the electrodes for producing a laser beam; an optical coupler, and a beam modification optical system in the path of the laser beam. The optical coupler is partially reflective so that at least a portion of the laser beam impinging on the optical coupler from the amplifier discharge chamber is reflected back through the amplifier discharge chamber and at least a portion of the laser beam impinging on the optical coupler from the amplifier discharge chamber is transmitted through the optical coupler. The beam modification optical system transversely expands a profile of the laser beam such that the near field laser beam profile uniformly fills each aperture within the laser and such that the regenerative ring resonator remains either conditionally stable or marginally unstable when operating the laser at powers that induce thermal lenses in optical elements inside the regenerative ring resonator.

The beam modification optical system reduces variations in output beam size that result from operation of a gas discharge laser amplifier over a range of average powers, some of which can be high.

Implementations can include one or more of the following features. For example, the beam modification optical system can be between the optical coupler and a beam turning optical element placed on a side of the discharge chamber opposite to a side facing the optical coupler. The beam modification optical system can be configured to cause the laser beam exiting the regenerative ring resonator to have the same or a larger size of the transverse profile than the size of the transverse profile of the laser beam entering the regenerative ring resonator.

The beam modification optical system can be configured to impart a negative curvature to the wavefront of the laser beam circulating within the regenerative ring resonator. The beam modification optical system can negatively alter the curvature along a transverse direction. The beam modification optical system can include a highly reflective mirror. The highly reflective mirror can be convex. The convex highly reflective mirror can have a radius of curvature of between about 50 m and about 170 m.

The laser can also include a beam turning optical element external to the discharge chamber and in the path of the laser beam on a side of the discharge chamber that is opposite to a side that faces the optical system.

The regenerative ring resonator can remain marginally unstable if the size of the transverse profile of the laser beam increases as the laser beam travels through a portion of the regenerative ring resonator but the laser beam transverse profile size does not exceed the transverse size of any of the optical components within the regenerative ring resonator before being decoupled out of the regenerative ring resonator through the optical coupler.

The beam modification optical system can include a set of prisms. The prism set can include first, second, and third prisms configured and arranged so that the first and third prisms reduce the transverse size of the profile of the laser beam travelling along a first direction through the beam modification optical system, and the third and second prisms increase the transverse size of the profile of the laser beam travelling along a second direction through the beam modification optical system. The one or more first, second, and third prisms can be adjusted so that the transverse size of the profile of the laser beam travelling along the second direction through the beam modification optical system and exiting the prism set is greater than the transverse size of the profile of the laser beam travelling along the first direction from the optical coupler to the prism set.

The laser beam output from the regenerative ring resonator can have an average irradiance of at least about 5 W/cm$^2$. In other implementations, the laser beam output from the regenerative ring resonator can have an average irradiance of at least about 10 W/cm$^2$. In some implementations, the peak irradiance of the laser beam output from the regenerative ring resonator can be less than 30 mJ/cm$^2$.

In other general aspects, a laser beam of an electric discharge gas laser is modified by directing the laser beam through an optical coupler of a regenerative ring resonator; directing the laser beam that passes through the optical coupler through a discharge chamber and back to the optical coupler such that at least some of the light impinging on the optical coupler from the discharge chamber is reflected back through the discharge chamber and at least some of the light impinging on the optical coupler from the discharge chamber is transmitted through the optical coupler; and transversely expanding a profile of the laser beam such that the near field laser beam profile uniformly fills each aperture within the laser and such that the regenerative ring resonator remains either conditionally stable or marginally unstable when operating the laser at powers that cause thermal lensing of elements within the regenerative ring resonator.

Implementations can include one or more of the following features. For example, the profile of the laser beam can be transversely expanded by compressing a profile of the laser beam by passing the laser beam from the optical coupler through first and third prisms of a prism set before directing the laser beam through the discharge chamber; and expanding a profile of the laser beam after it has passed through the discharge chamber by passing the laser beam through the third prism and through a second prism of the prism set before reaching the optical coupler. The laser beam profile can be expanded by expanding the laser beam profile to a size that is larger than the profile of the laser beam input to the prism set.

The regenerative ring resonator can remain marginally unstable if the size of the transverse profile of the laser beam increases as the laser beam travels through at least a portion the regenerative ring resonator but the laser beam transverse profile size does not exceed the transverse size of any of the optical components within the regenerative ring resonator before being decoupled out of the regenerative ring resonator through the optical coupler.

The profile of the laser beam can be transversely expanded by imparting a negative curvature to the wavefront of the laser beam circulating within the regenerative ring resonator.

In other general aspects, a regenerative ring resonator that is in the path of a laser beam includes a discharge chamber having electrodes and a gain medium between the electrodes; an optical coupler that is partially reflective so that at least some of the light impinging on the optical coupler from the discharge chamber is reflected back through the discharge chamber and at least some of the light impinging on the optical coupler from the discharge chamber is transmitted through the optical coupler; and a beam modification optical system in the path of the laser beam. The beam modification optical system is configured to transversely expand a profile of the laser beam such that the near field laser beam profile uniformly fills each aperture within the resonator and such that the regenerative ring resonator remains either conditionally stable or marginally unstable when operating the laser at powers that cause thermal lensing of elements inside of the regenerative ring resonator.

Implementations can include one or more of the following features. The beam modification optical system can be between the optical coupler and a beam turning optical element placed on a side of the discharge chamber opposite to a side facing the optical coupler.

The beam modification optical system can be configured to impart a negative curvature to the wavefront of the laser beam circulating within the regenerative ring resonator. The beam modification optical system can include a highly reflective convex mirror.

The regenerative ring resonator can remain marginally unstable if the size of the transverse profile of the laser beam increases as the laser beam travels through at least a portion of the regenerative ring resonator but the laser beam transverse profile size does not exceed the transverse size of any of the optical components within the regenerative ring resonator before being decoupled out of the regenerative ring resonator through the optical coupler.

The beam modification optical system can include a set of prisms. The prism set can include first, second, and third prisms configured and arranged so that the first and third prisms reduce the transverse size of the profile of the laser beam travelling along a first direction through the beam modification optical system, and the third and second prisms increase the transverse size of the profile of the laser beam travelling along a second direction through the beam modification optical system. The one or more first, second, and third prisms can be adjusted so that the transverse size of the profile of the laser beam travelling along the second direction and exiting the prism set is greater than the transverse size of the profile of the laser beam travelling along the first direction from the optical coupler to the prism set.

DRAWING DESCRIPTION

FIG. 2A is a plan view of a power ring amplifier of the laser system of FIG. 1;

FIG. 2B is a plan view of a beam reverse of the power ring amplifier of FIG. 2A;

FIG. 2C is a plan view of a chamber window of a gas discharge chamber of the power ring amplifier of FIG. 2A;

FIG. 2D is a plan view of a beam modification optical system of the power ring amplifier of FIG. 2A;

FIG. 8A is a plan view of the highly reflective mirror of FIG. 7A;

FIGS. 8B and 8C are orthogonal side views of the highly reflective mirror of FIG. 8A;

FIG. 12A is a plan view of the highly reflective mirror of FIG. 11A;

FIGS. 12B and 12C are orthogonal side views of the highly reflective mirror of FIG. 12A;

DESCRIPTION

Figure 1:
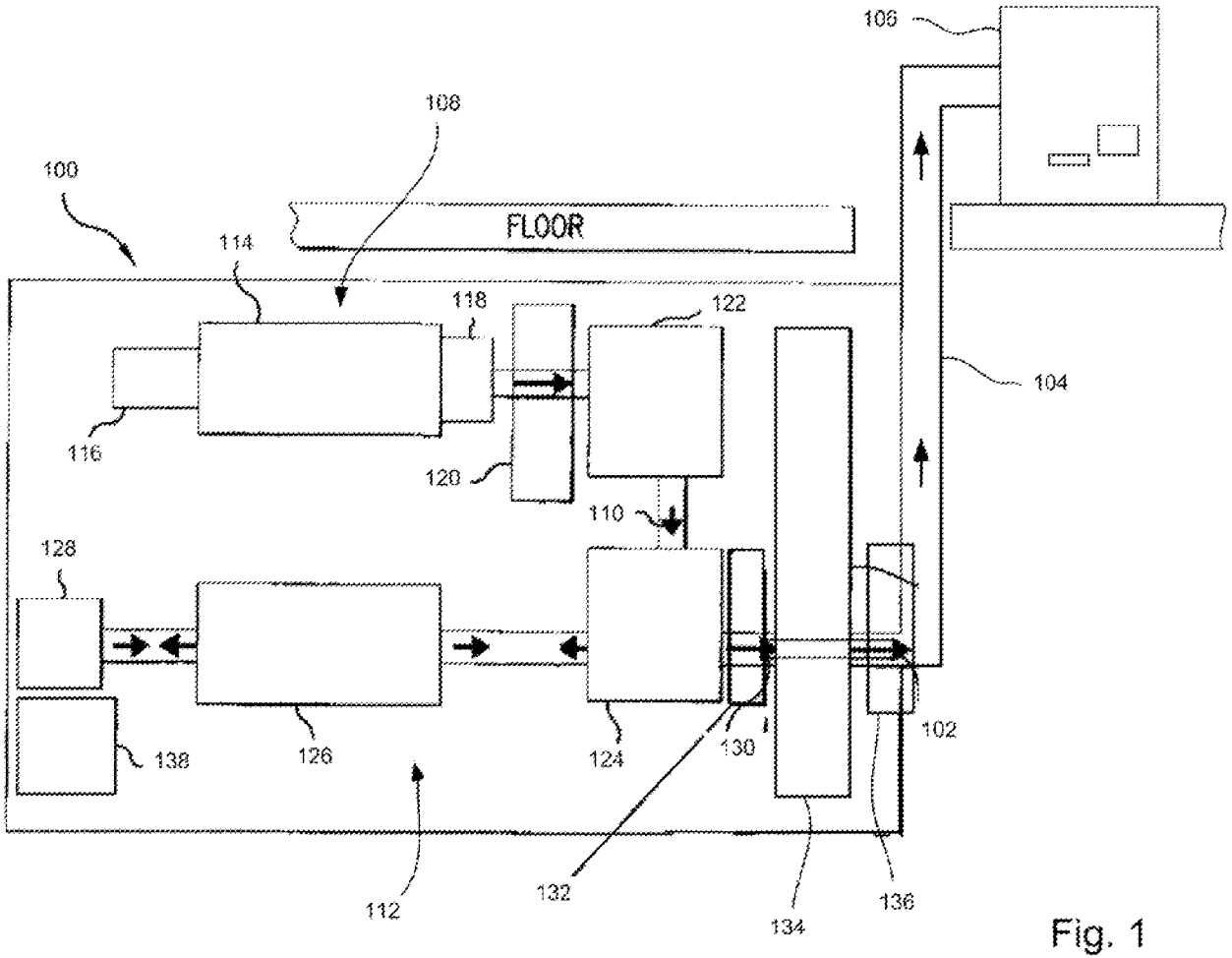
FIG. 1 is a block diagram of a high average-power laser system providing input to a lithography machine.
Figure 3:
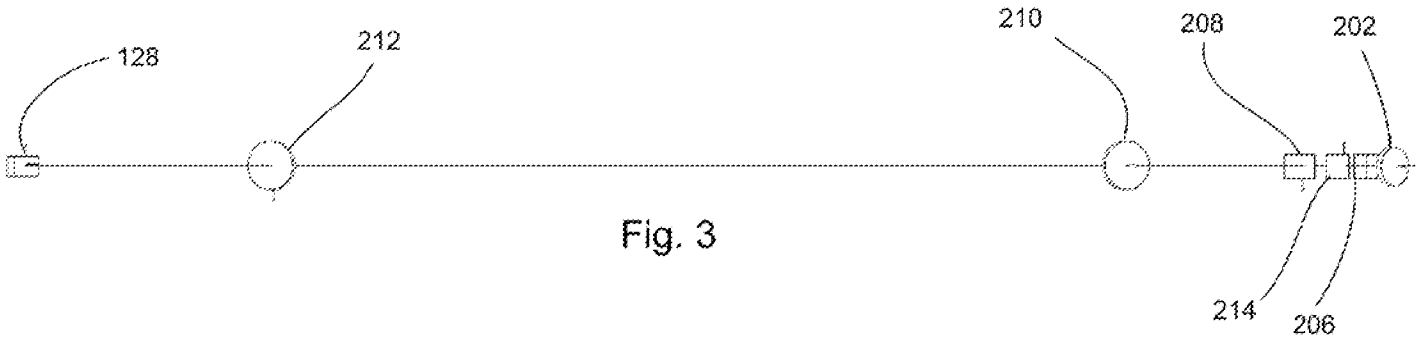
FIG. 3 is a side view of the power ring amplifier of FIG. 2A.

Referring to FIG. 1, a high average-power repetitively-pulsed laser system 100 produces a high power repetitively-pulsed laser beam 102 that is delivered through a beam delivery unit 104 to a lithography machine 106. The laser system 100 includes a master oscillator (MO) 108 that provides a seed laser beam 110 to a power ring amplifier (PRA) 112 (having a discharge chamber with a regenerative ring resonator). The master oscillator 108 enables fine tuning of parameters such as the center wavelength and the bandwidth at relatively low output pulse energies. The power ring amplifier 112 receives the output from the master oscillator and amplifies this output to attain the necessary powers in the laser beam 102 for output to use in the lithography machine 106.

The master oscillator 108 includes a discharge chamber 114 having two elongated electrodes, a laser gas, and a fan for circulating the gas between the electrodes, and a laser resonator is formed between a line narrowing module 116 on one side of the discharge chamber 114 and an output coupler 118 on a second side of the discharge chamber 114. The line narrowing module 116 can include a diffractive optic such as a grating that finely tunes the spectral output of the discharge chamber 114. The master oscillator 108 also includes a line center analysis module 120 that receives an output from the output coupler 118 and a beam modification optical system 122 that modifies the size and/or shape of the laser beam as needed. The laser gas used in the discharge chamber can be any suitable gas for producing a laser beam at a required wavelength and bandwidth, for example, the laser gas can be argon fluoride (ArF), which emits light at a wavelength of about 193 nm, krypton fluoride (KrF), which emits light at a wavelength of about 248 nm, or xenon chloride (XeCl), which emits light at a wavelength of about 351 nm.

The power ring amplifier 112 includes a beam modification optical system 124 that receives the seed laser beam 110 from the master oscillator 108 and directs the laser beam through a power ring amplifier discharge chamber 126, and to a beam turning optical element 128 where the direction of the laser beam is modified so that it is sent back into the discharge chamber 126 to form a circulating path that is also referred to as a regenerative ring resonator. The power ring amplifier discharge chamber 126 includes a pair of elongated electrodes, a laser gas, and a fan for circulating the gas between the electrodes. The seed laser beam 110 is amplified by repeatedly passing through the power ring amplifier 112. The optical system 124 provides a way (for example, an optical coupler such us a partially-reflecting mirror 202, discussed below) to in-couple the seed laser beam 110 and to out-couple a portion of the amplified radiation from the ring resonator to form an output laser beam 130. The output laser beam 130 is directed through a bandwidth analysis module 132, then through a pulse stretcher 134, where each of the pulses of the output laser beam 130 is stretched, for example, in an optical delay unit, to adjust for performance properties of the laser beam that impinges the lithography machine 106. The laser beam 102 that exits the pulse stretcher 134 can be directed through an automatic shutter 136 before entering the beam delivery unit 104.

The laser system 100 also includes a control system 138 coupled to the master oscillator 108 and to the power ring amplifier 112 tor controlling the pulse energy and accumulated dose energy output of the system 100 at pulse repetition rates of between about 4000 and 12,000 Hz or greater. The control system 138 provides repetitive triggering of the discharges in the chamber of the master oscillator 108 and the discharges in the chamber of the power ring amplifier 112 relative to each other with feedback and feed-forward control of the pulse and dose energy. The high power repetitively-pulsed laser beam 102 can have an average output power of between a few watts and hundreds of watts, for example, from about 40 W to about 200 W. The irradiance (that is, the average power per unit area) of the laser beam 102 at the output can be at least about 5 W/cm$^2$ or at least about 10 W/cm$^2$.

Referring also to FIGS. 2A-4, the power ring amplifier 112 is designed as a regenerative ring resonator. The seed laser beam 110 from the master oscillator 108 is directed to a folding mirror 200 of the beam modification optical system 124. The folding mirror 200 reflects the beam and directs it through an optical coupler, which is a partially reflecting mirror (and is sometimes referred to as an input/output coupler) 202, which is the entrance to the ring resonator and then to a highly reflective mirror 204. The mirror 204 is highly reflective if its reflectivity is greater than about 90% at or near the center wavelength of the laser beam for the desired polarization at the angle(s) of incidence used.

The highly reflective mirror 204 reflects the laser beam 110 through a first prism 206 and a third prism 208 that act together to compress the laser beam 110 horizontally to substantially match the transverse size of the gain medium, which is typically less than a few millimeters (mm) in high repetition-rate discharge-pumped excimer lasers. The third prism 208 aligns the laser beam 110 with a right chamber window 210 and a desired light path through the chamber 126, through a left chamber window 212, and to the beam turning optical element 128. From the beam turning optical element 128, the laser beam returns to the left chamber window 212, passes through the chamber 126 and the right chamber window 210, and then through the third prism 208, which shifts the laser beam to a second prism 214, which shifts the laser beam to the input/output coupler 202. The third and second prisms 208 and 214 acting together in this fashion magnify the beam exiting the chamber window 210 to match the transverse size of the incoming laser beam 110 and/or the desired horizontal size of the output laser beam 130. The beam impinging upon the input/output coupler 202 can be transmitted through the coupler 202 to form an amplified laser beam 130 that is directed toward the bandwidth analysis module 132. The input/output coupler 202 is partially reflective, for example, 20% reflective, such that at least some of the light impinging upon the input/output coupler 202 can be reflected back to the discharge chamber 126 through the optical system 124, providing regenerative feedback.

The first and third prisms 206 and 208 are positioned and arranged relative to each other so that they reduce the size of the transverse profile of the laser beam 110 travelling along a first direction through the wavefront modification optical system 124. That is, the first and third prisms 206 and 208, in combination and in the geometric configuration shown, demagnify the horizontal size of the laser beam that travels along the first direction, which is from the highly reflective mirror 204 toward the right chamber window 210, to substantially match the transverse size of the discharge plasma and effectively utilize the laser gain. The third and second prisms 208 and 214 are positioned and arranged relative to each other so that they increase the size of the transverse profile of the laser beam 130 travelling along a second direction through the wavefront modification optical system 124. That is, the third and second prisms 208 and 214, in combination and in the geometric configuration shown, magnify the horizontal size of the laser beam that travels along the second direction, which is from the right chamber window 210 to the input/output coupler 202, to match the transverse extent of the incoming laser beam 110 and/or the desired horizontal size of the output laser beam 130.

The beam turning optical element 128 is an optical system made of one or more precision devices each having precision optical materials such as, for example, materials having a crystalline structure such as calcium fluoride (CaF2). Additionally, the beam turning optical element 128 has precision optically finished faces. The beam turning optical element 128 can be any combination of one or more optical devices that receive a light beam and change a direction of the light beam so that it is transmitted back into the discharge chamber 126. For example, the beam turning optical element 128 can be a prism having two reflecting surfaces, as shown in FIGS. 2A and 2B. As another example, the beam turning optical element 128 can include a plurality of mirrors arranged to reflect a beam back into the discharge chamber 126.

The input/output coupler 202 is a partially reflective mirror, for example, with between about 10% to about 60% reflectivity back into the chamber 126, thus forming an oscillation cavity that allows for laser pulse intensity build up during the oscillation through the excited gas gain medium between the electrodes within the chamber 126 during the electrical discharge.

The optical components (such as the coupler 202, highly reflective mirror 204, prisms 206, 208, 214, the highly reflective mirror 204, the chamber windows 210, 212, and the beam turning optical element 128) of the power ring amplifier 112 are typically crystalline structures that are able to transmit very high pulse energy laser pulses at very short wavelengths with minimal losses, for example, 193 nm or 248 nm. For example, these components can be made of calcium fluoride (CaF2), magnesium fluoride (MgF2), or fused silica.

In summary, the optical components (coupler 202, highly reflective mirror 204, and prisms 206, 208, and 214) of the beam modification optical system 124 direct the seed laser beam 110 through the chamber 126, where the laser beam is amplified, and then passed to the beam turning optical element 128, which directs the laser beam back through the chamber 126 where the laser beam is further amplified and at least some of the further amplified laser beam is passed through the coupler 202 to exit the power ring amplifier 112 as the output laser beam 130 while at least some of the laser beam is reflected by the coupler 202 back into the ring resonator for further amplification.

The following discussion uses the terms "beam profile," "near field," "far field," "system aperture," and "aperture" to describe some of the optical effects noticed within the power ring amplifier 112.

The term "aperture" is a hole, structure, or opening through which light travels. More specifically, the aperture of an optical system is an opening that determines the cone angle of a bundle of rays that come to a focus in the image plane. The power ring amplifier 112 can have many openings or structures that limit the ray bundles. For example, these structures may be the edge of a lens or a mirror, an opening in an otherwise opaque body, or a ring or other fixture that holds an optical element in place, or may be a special element such as a prism placed in the optical path to limit the light admitted by the system. In general, these structures are called stops, and the aperture stop is the stop that determines the ray cone angle, or equivalently the brightness, at an image point.

The laser system 100 has a defined aperture stop at the output of the pulse stretcher 134; the defined aperture stop at the output of the laser system 100 is also referred to as the "system aperture."

The term "beam profile" is the distribution of energy in position across a direction that is transverse to the beam propagation direction. The "near field" beam profile refers to the distribution of energy in position across an aperture close to or very near to the aperture. The "far field" beam profile is the distribution of energy in position across an aperture at a plane far away from the aperture. Practically, the distribution of energy in position far enough away from the system aperture is entirely dominated by distribution in angle at the system aperture. Thus, if a light beam had zero divergence, then the distribution of energy in position will be the same at aperture and also very far away from the aperture. If a light beam has non-zero divergence, then there is a distance beyond which the spreading due to divergence (roughly angle×distance) contributes much more to the distribution of energy in position than did the initial (near-field) distribution.

The output laser beam 130 can suffer from narrowing of the horizontal near-field profile such that the laser beam 130 exiting the laser beam modification optical system 124 has a smaller horizontal profile than the horizontal profile of the laser beam 110 entering the beam modification optical system 124. This narrowing can be caused by wavefront variations when the operating duty cycle is such that the average power incident upon or transmitted through the optical components of the power ring amplifier 112 is very high. Such wavefront variations can result from heating of the optical components (such as, for example, the chamber windows 210, 210) due to absorption of a fraction of the optical power circulating in the power ring amplifier 112, which induces positive thermal lenses in these optical components.

The beam modification optical system 124 is designed to transversely expand the beam profile of the laser beam exiting the power ring amplifier 112 relative to the laser beam wavefront entering the power ring amplifier 112. The term "transverse" can be any direction that is perpendicular to an optical axis (which is also referred to as a longitudinal direction) of the laser beam 110. Thus, the beam profile is transversely expanded if the profile is expanded along a direction that is perpendicular to the beam's optical axis.

In some implementations, this expansion system can be a system that negatively alters the wavefront curvature of the laser beam so that the divergence of the laser beam increases to offset the horizontal near-field profile narrowing. Thus, the wavefront curvature imparted to the beam is more negative relative to the laser beam coming out of the other elements inside of the ring amplifier 112 so as to compensate, for example, for a positive thermal lens in one or more of the optical components of the ring amplifier 112 such as a prism or the chamber windows. In the near field, the size of the laser beam is not appreciably larger; but after the laser beam has propagated around the power ring amplifier 112 a few times, the beam's transverse dimension can increase appreciably.

In other implementations, this expansion system can be a system that simply magnifies (for example, using refraction across planar surfaces of sets of prism pairs) the beam profile so that the transverse spot size of the laser beam is broadened in the near-field to offset the horizontal near-field profile narrowing. In this case, the imbalanced prism pairs magnify the laser beam and increase its transverse dimension immediately at the exit face of the last prism of the wavefront expansion system. Moreover, the imbalanced prism pairs can also reduce the divergence of the beam even though they serve to expand or broaden the beam in the near-field.

In either case, the expansion system keeps the near field laser beam from collapsing so that the near field laser beam uniformly fills all of the apertures within the laser system 100 including apertures within the power ring amplifier 112 and the system aperture while preserving other properties (such as a relatively low horizontal divergence) of the output laser beam 130, as discussed in greater detail below.

Thus, the beam modification optical system 124 can be designed with a negative wavefront curvature system that negatively alters the curvature of the wavefront of the laser beam 130 exiting the beam modification optical system 124 relative to the laser beam 110 entering the beam modification optical system 124. In this way, the laser beam 130 has the same or a larger transverse (for example, horizontal) profile than the transverse (for example, horizontal) profile of the laser beam 110 entering the beam modification optical system 124. Additionally, the wavefront curvature is preferably altered such that the regenerative ring resonator (the PRA 112) does not become a stable resonator but remains either conditionally stable or marginally unstable when operating the laser at powers that induce thermal lenses in optical elements inside of the regenerative ring resonator.

The ring resonator is conditionally stable if the laser beam transverse profile remains substantially constant at a particular location inside the resonator after an infinite number of passes through the resonator and the laser beam transverse profile does not ever exceed the transverse size of any of the optical components within the resonator even after an infinite number of passes through the resonator. The ring resonator is marginally unstable if the laser beam transverse profile increases in size as it travels through the resonator but does not ever exceed the transverse size of any of the optical components within the resonator before being decoupled out of the resonator. For example, if the laser pulse duration is about 20 ns, and it takes about 4-5 ns for light complete a single round trip through the regenerative ring resonator, then the laser pulse will be decoupled out of the resonator after about 4-5 round trips through the regenerative ring resonator. To put it another way, the laser beam transverse profile remains fully supported by optical components within a resonator even though the size of the transverse profile stays the same or increases while traveling through the resonator. In a stable (but not conditionally stable) resonator, the laser beam transverse profile size can decrease at various stages as it passes through the resonator and the laser beam transverse profile size does not ever exceed the transverse size of any of the optical components within the resonator no matter how many times it passes through the resonator.

Figure 15A:
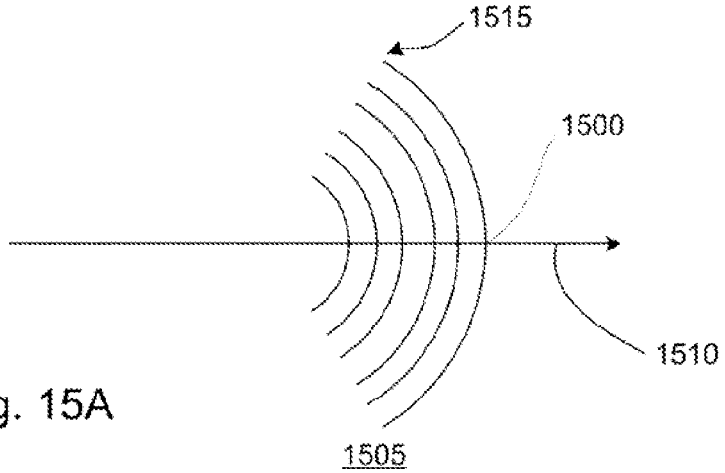
FIGS. 15A-15C are optical diagrams showing, respectively, a negative curvature wavefront, a positive curvature wavefront, and a zero curvature wavefront.
Figure 15B:
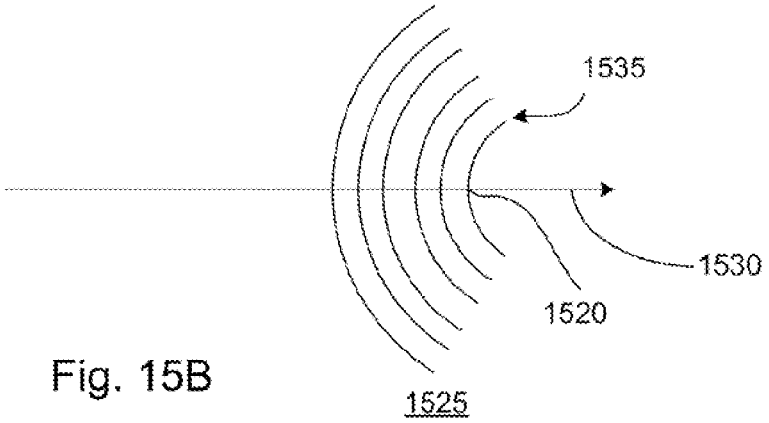
Figure 15C:
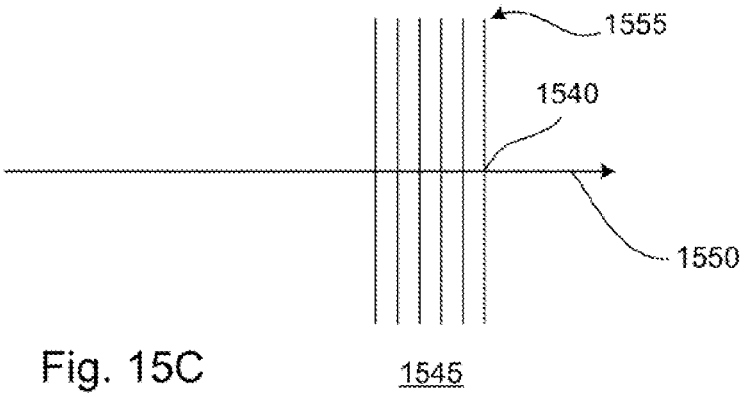

Referring to FIG. 15A, a wavefront has a "negative" curvature if a center 1500 of the wavefront 1505 is pointing along a propagation direction 1510 of the laser beam, that is, the wavefront center 1500 is advanced when compared to an edge 1515 of the wavefront 1505. Referring to FIG. 15B, a wavefront has a "positive" curvature if a center 1520 of the wavefront 1525 is pointing opposite to a propagation direction 1530 of the laser beam, that is, the wavefront center 1520 is retarded when compared to a wavefront edge 1535. Therefore, the beam modification optical system 124 negatively alters the curvature of the wavefront of the laser beam 130 relative to the laser beam 110 if the center of the wavefront of the laser beam 130 is advanced farther than the center of the wavefront of the laser beam 110 relative to the respective wavefront edges. Referring to FIG. 15C, a wavefront has "zero" curvature if a center 1540 of a wavefront 1545 aligns, transversely to a propagation direction 1550, with a wavefront edge 1555.

Narrowing of the transverse output energy distribution (also referred to as "beam narrowing") can occur in the vertical direction but the impact of the narrowing may not be significant since the thermal gradients can be lower in the vertical direction for many practical high-repetition rate excimer laser systems (in particular, the mode side in the vertical direction can be about ten times as large as the mode size in the horizontal direction). Thus, the beam narrowing could be corrected in a general transverse direction, which is any direction that is perpendicular to the path that the laser beam travels (that is, the optical axis), and therefore can be the horizontal direction or the vertical direction if the beam profile is aligned with the horizontal and vertical direction.

The negative wavefront curvature system can be integrated with any of the components of the optical system 124, for example, it can be a modification to the design or location of one or more components of the optical system 124.

The negative wavefront curvature system can be implemented by modifying the highly reflective mirror 204 to have a curved (convex) reflective surface. In prior designs, the highly reflective mirror 204 is substantially flat (to an accuracy within a wavelength of the light that is reflected from the mirror 204) so that it would not impart any significant wavefront change (such as, for example, a change in curvature to the wavefront) to the reflected laser beam. In the negative wavefront curvature system, the highly reflective mirror 204 has a slightly convex shape to impart a small amount of negative curvature to the wavefront to the wavefront of the laser beam reflected by the mirror 204. The highly reflective mirror 204 can be curved either by manufacturing a mirror to have a permanent convex profile in the transverse direction of interest (as described with respect to FIGS. 5-8C) or by bending a flat mirror to have a convex shape using a bending device (as described with respect to FIGS. 9-12C).

Referring to FIGS. 5-8C, the beam modification optical system 124 is arranged on a support 500 that is within a sealed housing 502. In this implementation, the highly reflective mirror 504 is manufactured to have a permanent convex profile in the horizontal direction on its reflective surface 506 and is mounted to a mirror mount 508 that is arranged on the support 500. The highly reflective mirror 504 is made upon a crystalline substrate or other substrate that is robust against exposure to high average powers at very short wavelengths, for example, at wavelengths of 193 nm or 248 nm. For example, the highly reflective mirror 504 can be formed upon a calcium fluoride (CaF2) or magnesium fluoride (MgF2) substrate. The clear aperture 510 of the mirror 504 is shown in dashed lines in FIG. 8A. The convex profile can be any convex shape, for example, it can be in the shape of an arc of a cylinder. The reflectivity of the surface 506 can be greater than 94% (for example, from about 94% to about 97%) for a ray striking the surface at 45° and at a wavelength of about 193 nm in the desired polarization state. As shown in FIGS. 8A-C, in this design, the highly reflective mirror 504 has a convex profile in only the horizontal direction 800 such that the laser beam profile along the vertical direction 850 is substantially unchanged upon reflection from the mirror 504. The convex profile can be such that the mirror 504 has a radius of curvature along the horizontal direction of between about 50 m and 170 m. To put it another way, the convex profile is such that mirror 504 has a surface sag of between about 300 nm to about 1000 nm for a 20 mm horizontal aperture.

Referring to FIGS. 9-12C, the beam modification optical system 124 is arranged on a support 900 that is within a sealed housing 902. In this implementation, the highly reflective mirror 904 is manufactured to have a substantially flat profile in both the horizontal and the vertical directions on its reflective surface 906 and is mounted to a bending device (mirror mount) 908 that is arranged on the support 900. The mirror mount 908 acts to bend the mirror 904 to impart a convex shape to the mirror 904. Similar to the mirror above, the highly reflective mirror 904 is made upon a crystalline substrate or other substrate that is robust against exposure to high average powers at very short wavelengths, for example, at wavelengths of 193 nm or 248 nm. For example, the highly reflective mirror 904 can be formed upon a calcium fluoride (CaF2) or a magnesium fluoride (MgF2) substrate. The reflectivity of the surface 906 can be greater than 94% for a ray striking the surface at 45° and at a wavelength of about 193 nm. As shown in FIGS. 12A-C, in this design, the highly reflective mirror 904 has a flat profile in both the horizontal direction and the vertical direction.

Referring to FIGS. 11A-D, the mirror mount 908 bends the mirror 904 along the horizontal direction such that the reflective surface 906 has a convex shape along the horizontal direction. The mirror mount 908 includes a rear device 1100 attached to a back side of a mirror extension 1102 of the support 900 and a front device 1104 attached to a front side of the mirror extension 1102. The rear device 1100 includes one or more press devices 1106 that make contact with the rear of the mirror 904 and the front device 1104 includes one or more press devices 1108 that make contact with the front (the reflective surface 906) of the mirror 904. The mirror 904 is placed inside of an opening 1110 formed in the mirror extension 1102 and between the press devices 1106 and 1108. In operation, the rear device 1100 applies pressure to the mirror 904 at locations where the one or more press devices 1106 contact the rear of the mirror 904 and the front device 1104 applies pressure to the mirror 904 at locations where the one or more press devices 1108 make contact with the front of the mirror 904 to impart a convex shape to the mirror 904.

As discussed above, the negative wavefront curvature system can be integrated with any of the components of the optical system 124, for example, the negative wavefront curvature system can be a modification to the design and/or location of one or more components of the optical system 124. In the example described above, the negative wavefront curvature system is implemented by modifying the highly reflective mirror 204 to have a curved (convex) reflective surface.

Figure 4:
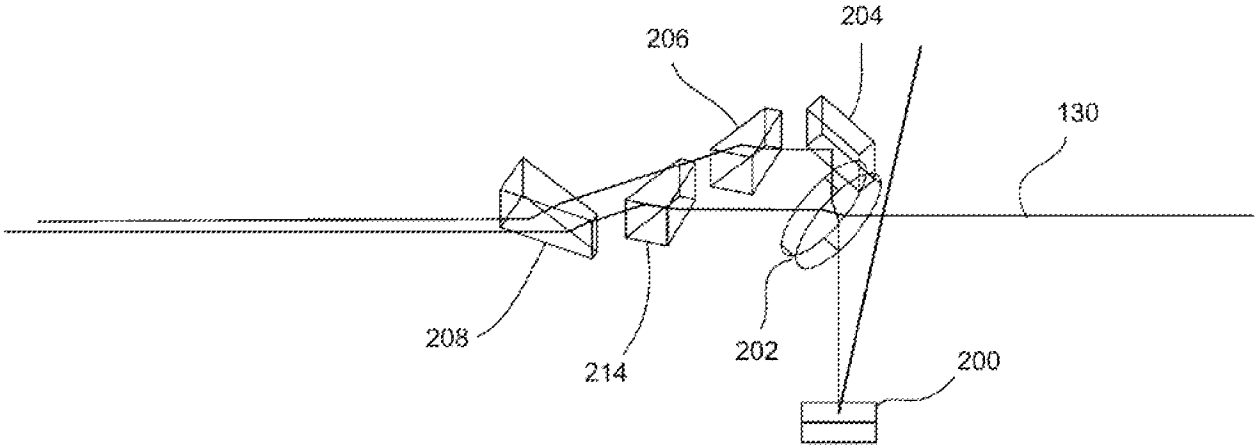
FIG. 4 is a perspective view of the beam modification optical system of FIG. 2D.
Figure 5:
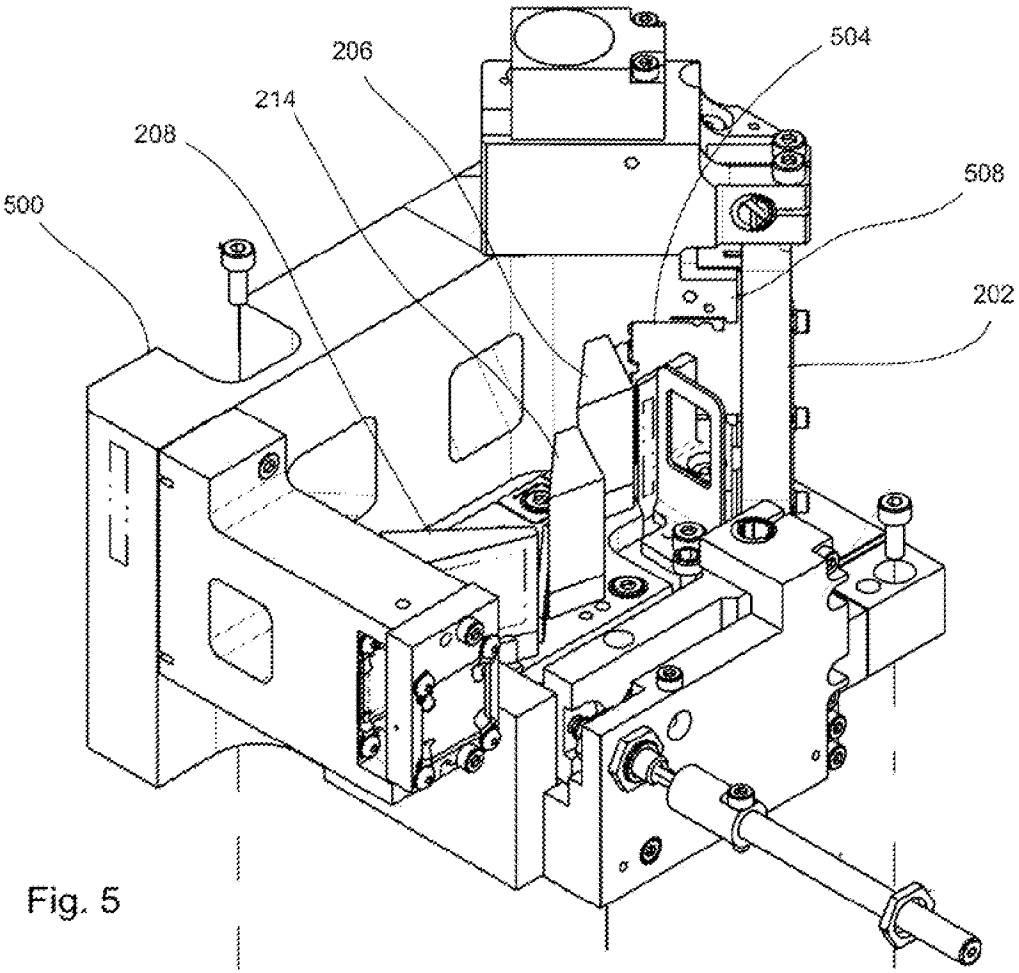
FIG. 5 is a perspective view of a first implementation of the beam modification optical system mounted to a housing.
Figure 6:
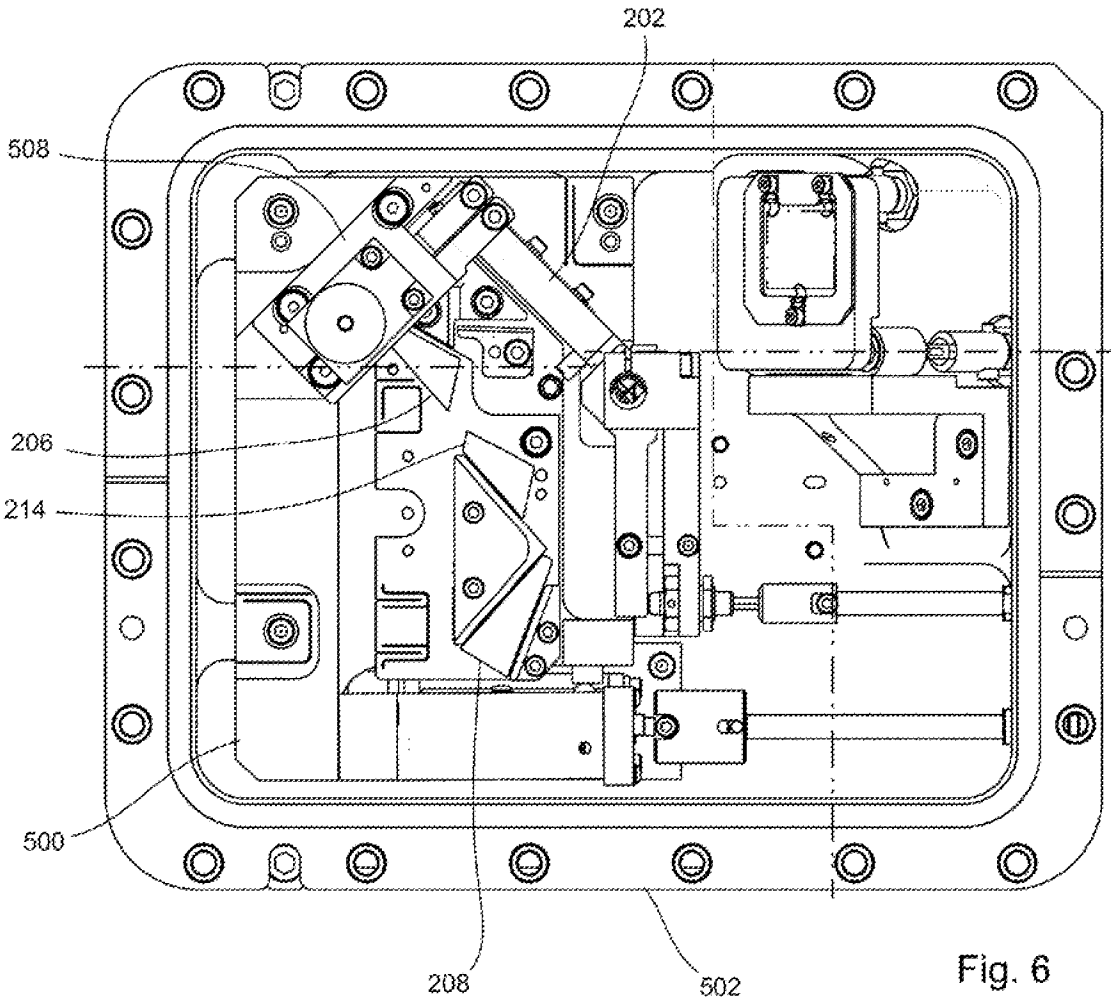
FIG. 6 is a plan view of the first implementation of the beam modification optical system mounted to the housing.
Figure 7B:
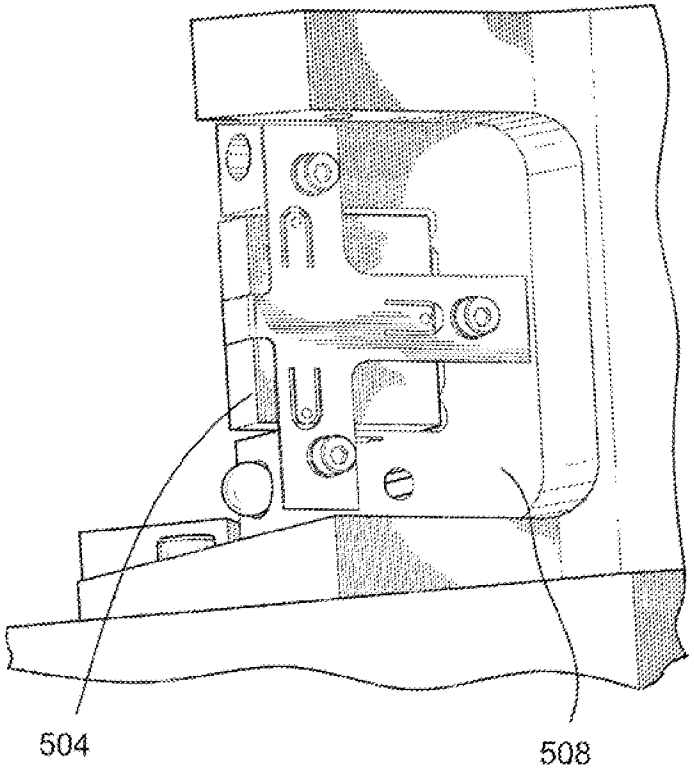
FIGS. 7A and 7B are, respectively, front and back perspective views of a highly reflective mirror mounted to a mirror mount that is attached to the beam modification optical system housing of FIGS. 5 and 6.
Figure 7A:
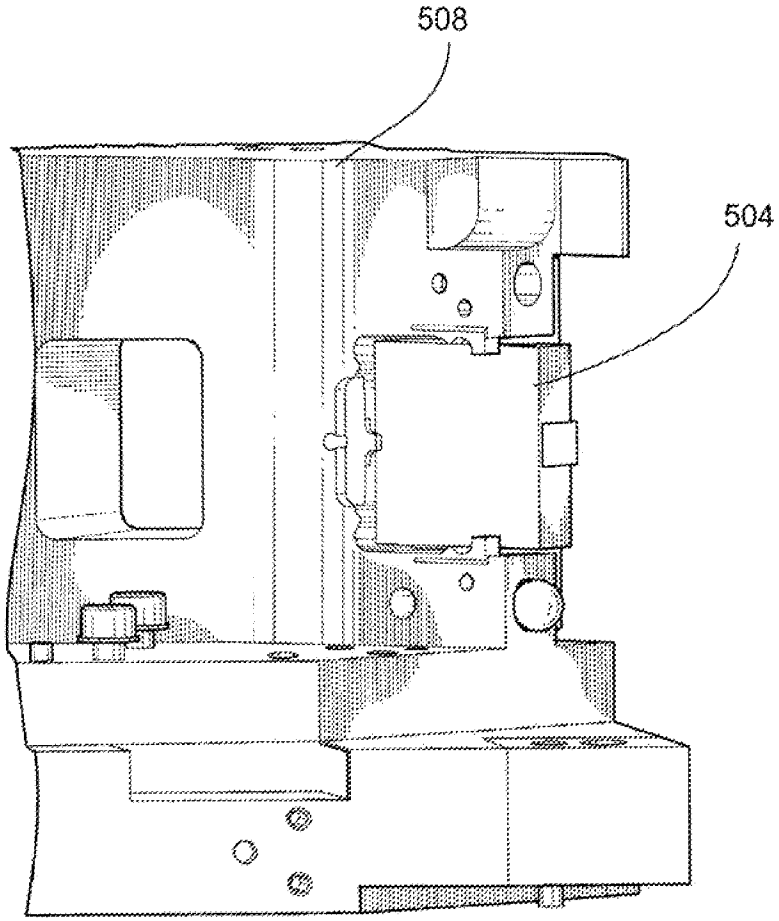
Figure 9:
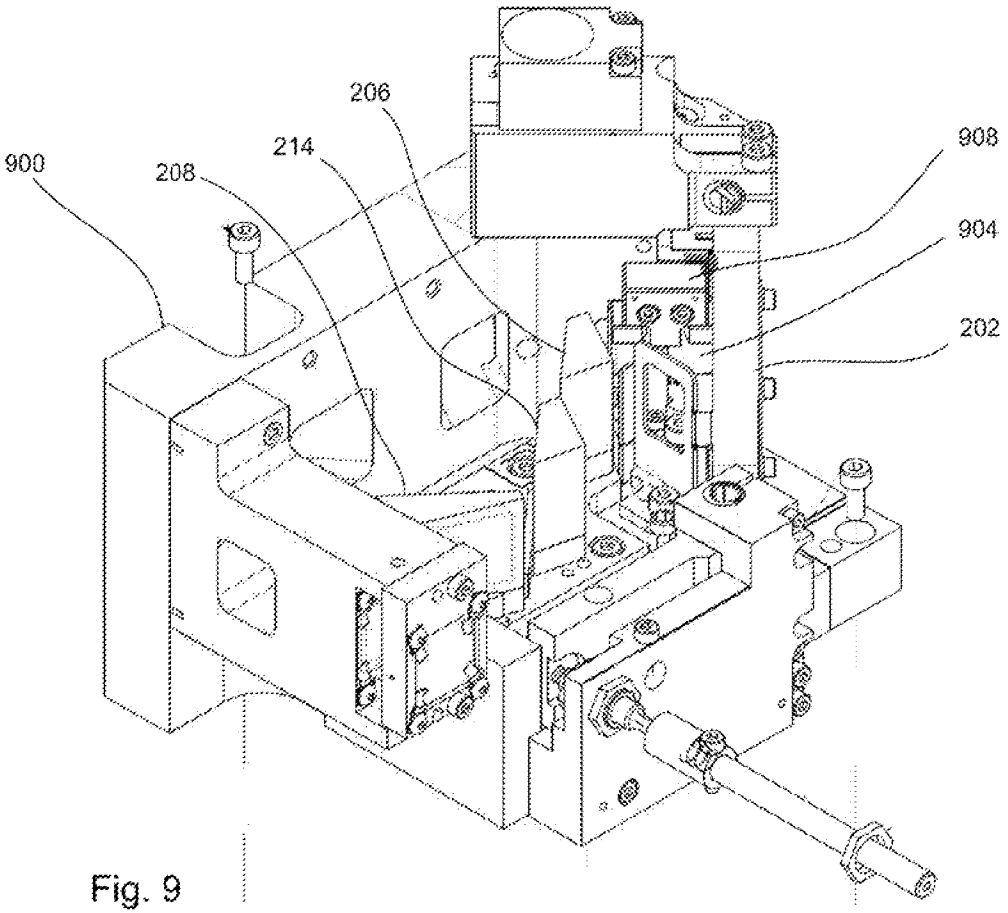
FIG. 9 is a perspective view of a second implementation of the beam modification optical system mounted to a housing.
Figure 10:
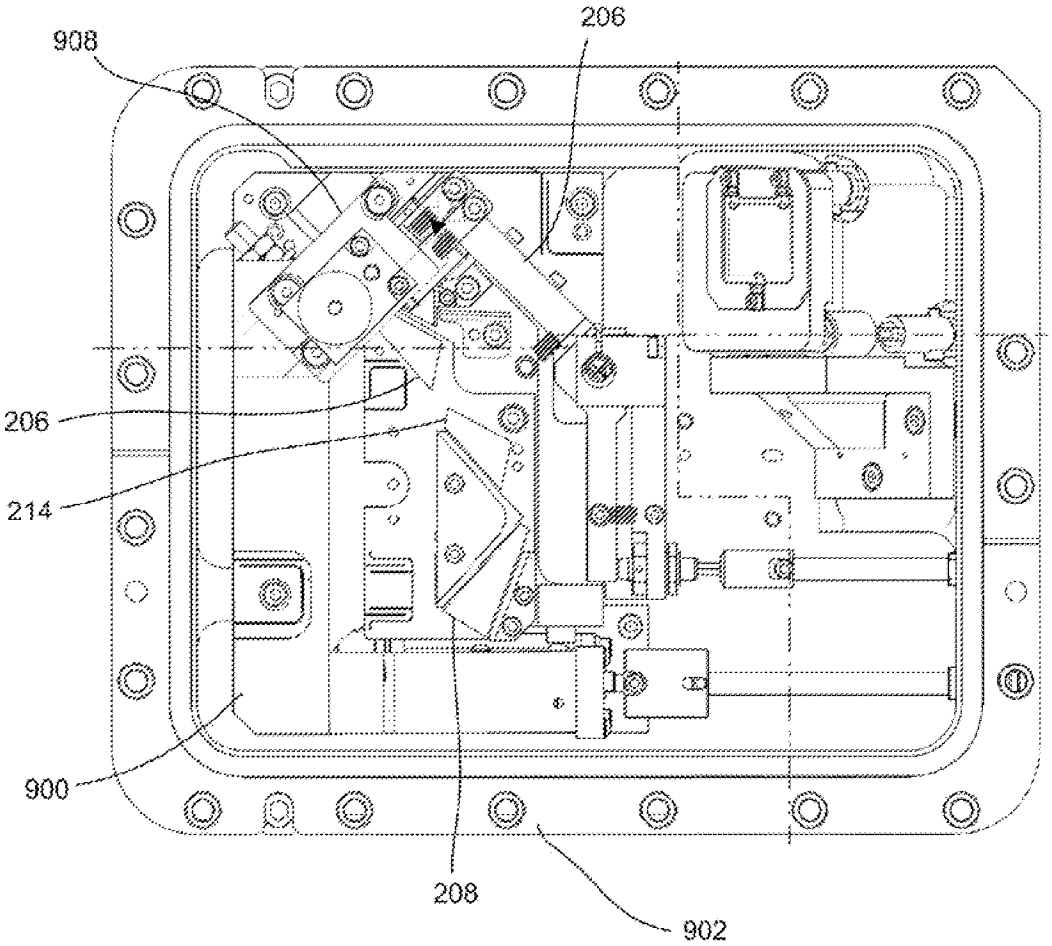
FIG. 10 is a plan view of the second implementation of the beam modification optical system mounted to the housing.
Figure 11A:
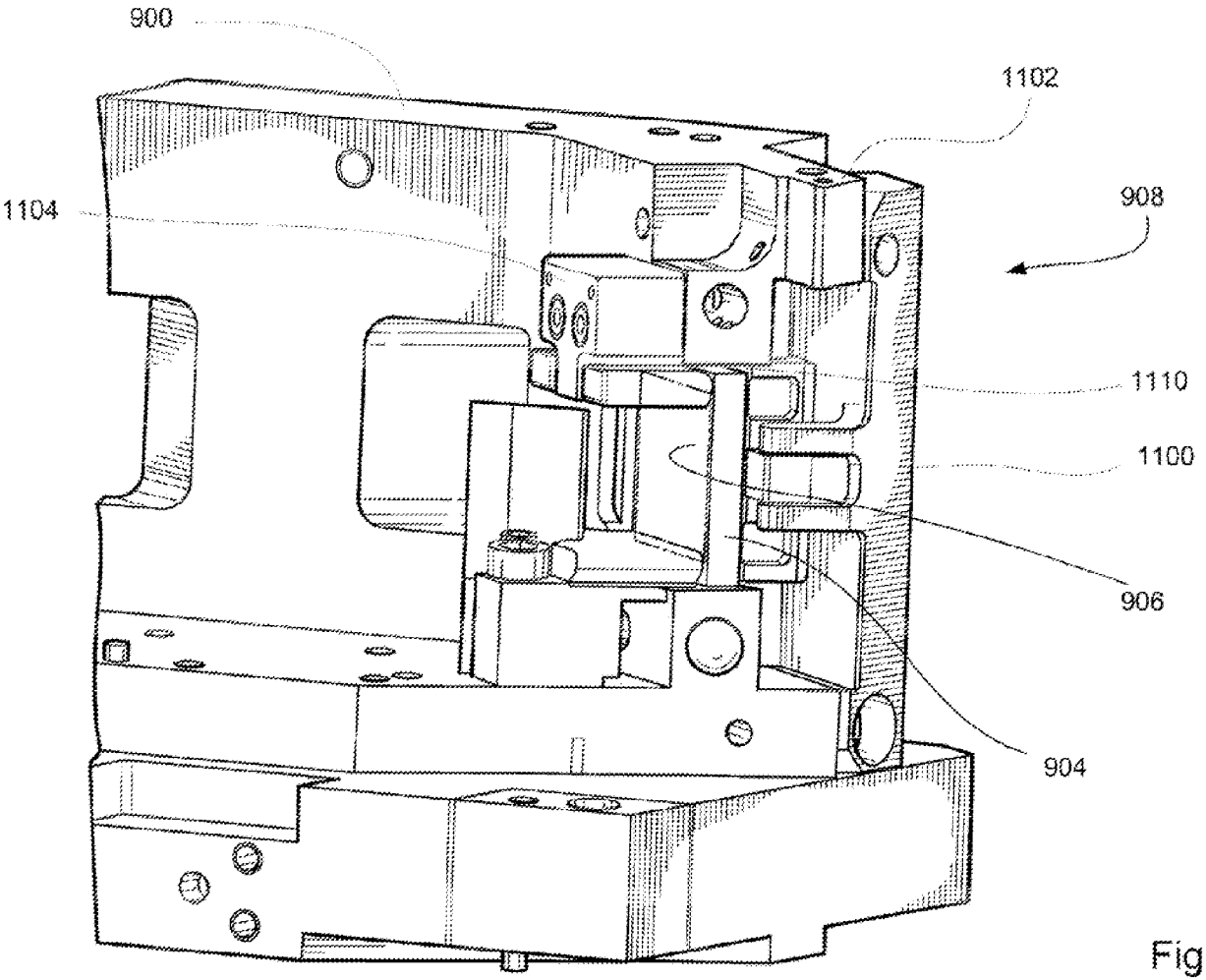
FIG. 11A is a perspective view of a highly reflective mirror mounted to an adaptive mirror mount that is attached to the beam modification optical system housing of FIGS. 9 and 10.
Figure 11C:
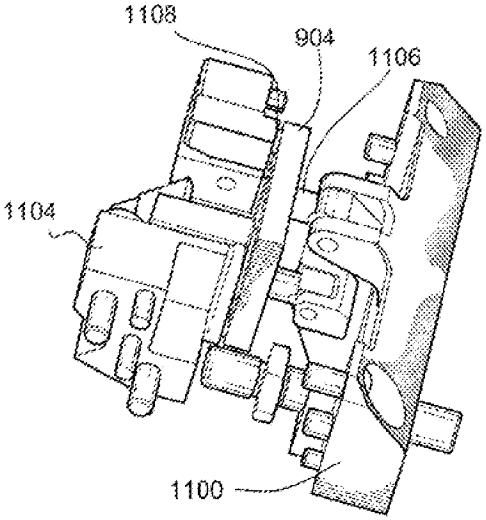
FIGS. 11B-11D are perspective views of the mount for the highly reflective mirror of FIG. 11A.
Figure 11B:
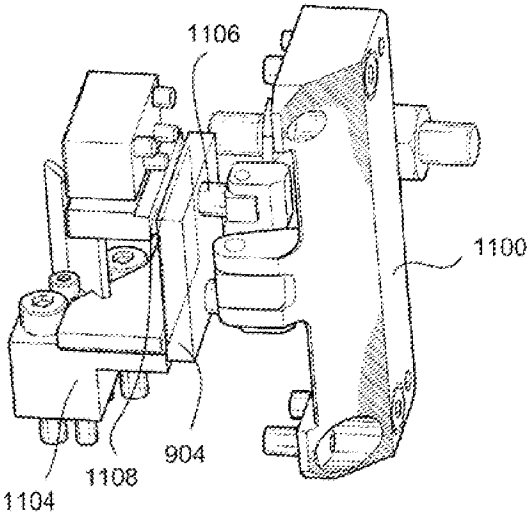
Figure 11D:
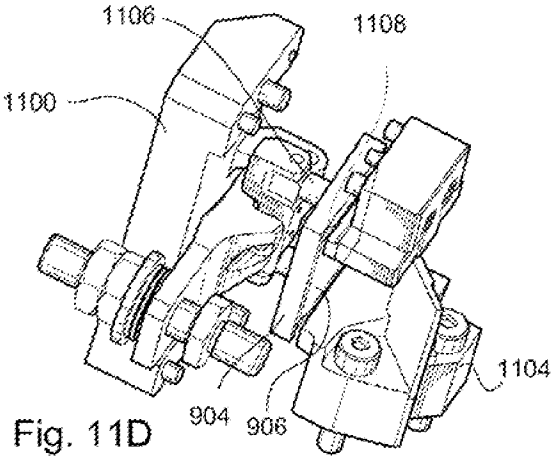

As another example, and with reference to FIG. 4, the beam expansion system can be implemented by modifying one or more aspects of the prisms 206, 208, and 214 to magnify the laser beam exiting the wavefront modification optical system 124 relative to the laser beam entering the wavefront modification optical system 124. For example, the relative distance between the first and third prisms could be modified or the relative distance between the third and second prisms could be modified. As another example, the angle of placement of one or more of the prisms could be modified relative to the other prisms. As a further example, the material properties or surface figure of one or more of the prisms could be modified to change the de-magnification or magnification of the transverse extent of the laser beam that passes through the prisms.

Figure 13A:
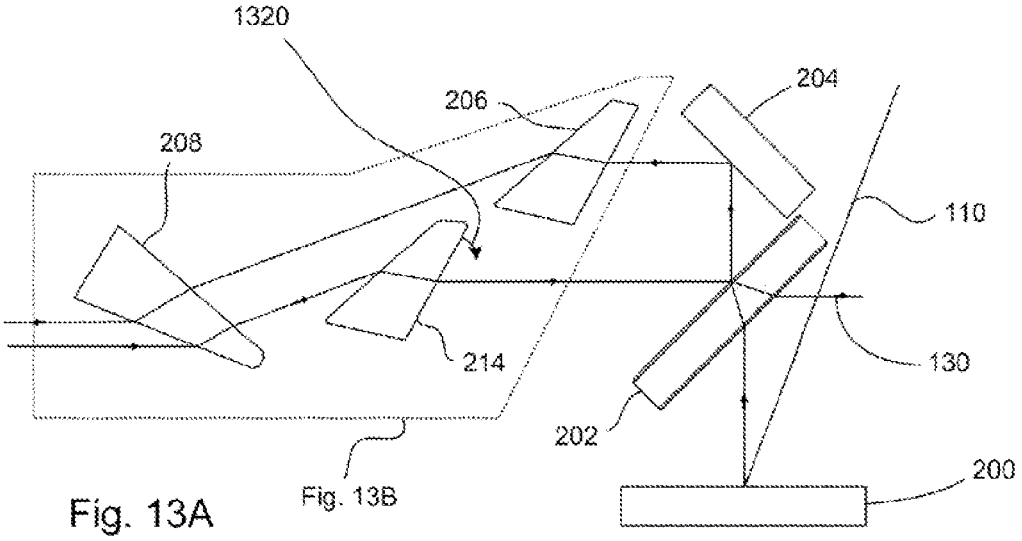
FIG. 13A is a plan view of another implementation of the beam modification optical system of the power ring amplifier of FIG. 2A.
Figure 13B:
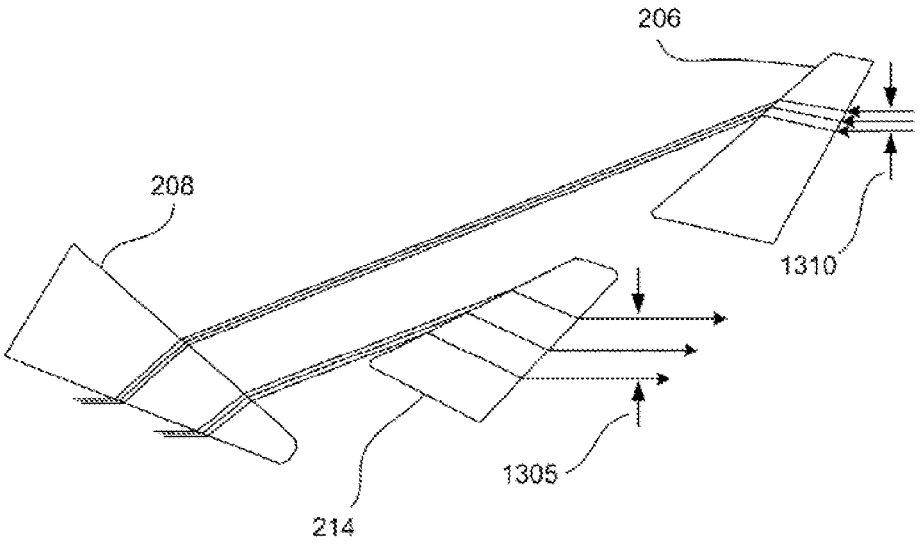
FIG. 13B is a plan view of a detail of the beam modification optical system of FIG. 13A.

Thus, as shown in FIGS. 13A and 13B, and as discussed above, the first and third prisms 206 and 208 are positioned and arranged relative to each other so that they reduce the size of the transverse profile of the laser beam 110 travelling along a first direction through the wavefront modification optical system 124. That is, the first and third prisms 206 and 208, in combination and in the geometric configuration shown, de-magnify the horizontal size of the laser beam that travels along the first direction, which is from the highly reflective mirror 204 toward the right chamber window 210, to substantially match the transverse size of the discharge plasma and effectively utilize the laser gain. The third and second prisms 208 and 214 are positioned and arranged relative to each other so that they increase the size of the transverse profile of the laser beam 130 travelling along a second direction through the wavefront modification optical system 124. That is, the third and second prisms 208 and 214, in combination and in the geometric configuration shown, magnify in the near-field the horizontal size of the laser beam that travels along the second direction, which is from the right chamber window 210 to the input/output coupler 202, to match the transverse extent of the incoming laser beam 110 and/or the desired horizontal size of the output laser beam 130.

The net effect of the horizontal prism sequence (prisms 206 to 208 and then prisms 208 to 214) is to slightly magnify the horizontal near-field such that the near field profile of the laser beam uniformly fills all of the apertures within the laser system 100 including apertures within the power ring amplifier 112 and the system aperture, and such that the regenerative ring resonator remains either conditionally stable or marginally unstable when operating the laser at powers that induce thermal lenses in the optical elements inside of the regenerative ring resonator. To impart this net beam magnification (or expansion), one could modify the relative angle between the third prism 208 and the second prism 214 to cause a slightly greater magnification in the horizontal size of the laser beam that travels along the second direction. For example, as shown in FIG. 13B, one could do this by rotating the second prism 214 relative to the third prism 208 about an angle in the direction of the arrow 1320. The angle of rotation depends on how much greater magnification would be desired. For example, the angle of rotation could be greater than 0° (zero) but less than about 10° relative to the position of the second prism 214 in the set up that matches the transverse size of the laser beam 130 with the transverse size of the laser beam 110. In order to rotate the prism 214, the prism 214 can be mounted on a rotationally movable mount that is connected to a rotational position actuator such as a stepper motor and/or a piezoelectric-based actuator. In other implementations, one or more of the prisms 206, 208, and 214 are rigidly affixed so as to impart a fixed magnification on each round trip.

Additionally, it is possible that the negative wavefront curvature system can be implemented by, in combination, modifying one or more aspects of the prisms 206, 208, and 214 and by modifying the highly reflective mirror 204 to have a curved (convex) reflective surface.

Figure 14:
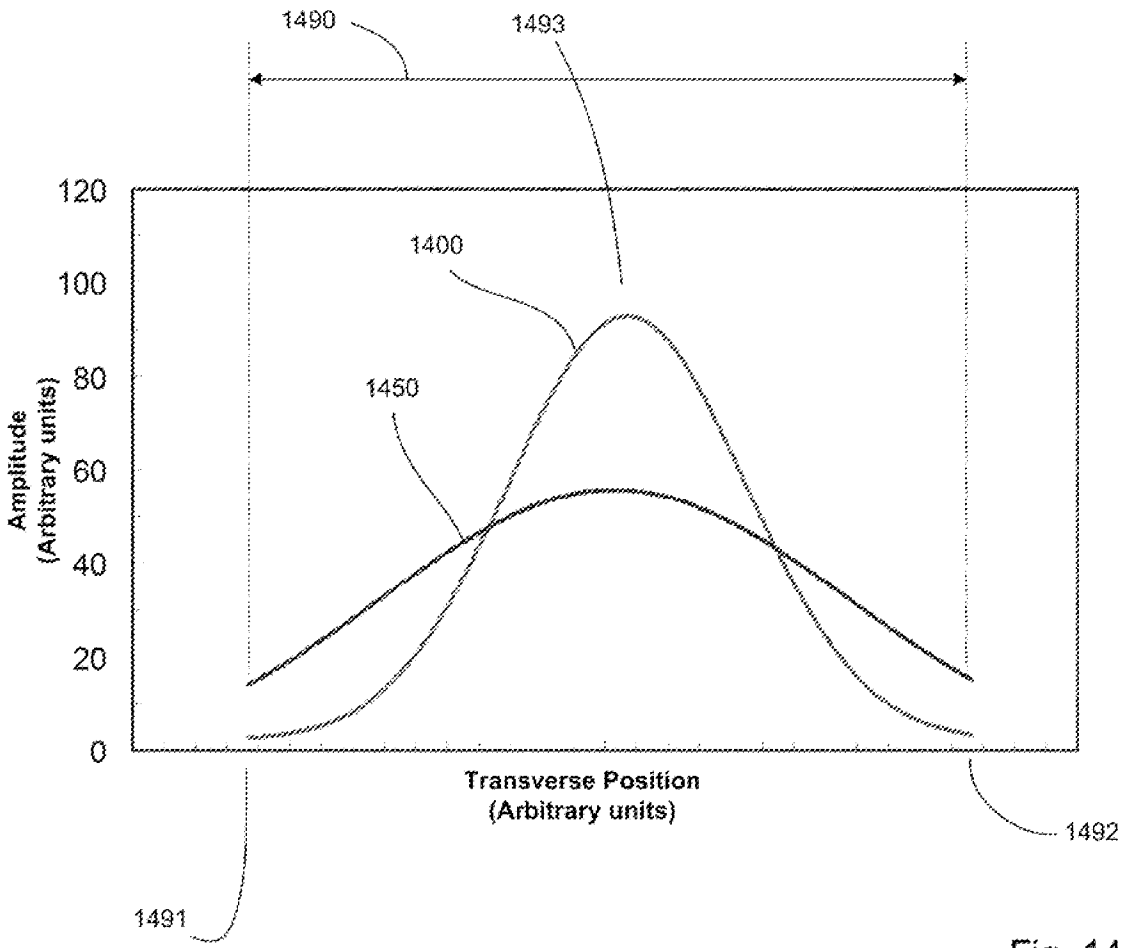
FIG. 14 is a graph of the signal amplitude versus distance from the center of the laser beam taken for different curvatures of the highly reflective mirror.

Referring also to FIG. 14, a graph of the energy density (or the square of the electric field amplitude) of the laser beam 130 versus distance from center of the beam along a transverse direction (for example, the horizontal direction) is shown for two different scenarios. In the first scenario, the beam modification optical system 124 of the regenerative ring resonator (the PRA 112) lacks a beam expansion system that is the subject of this disclosure (such as the negative wavefront curvature system discussed above); that is, in this scenario, for example, the highly reflective mirror has a substantially flat curvature. Raw data was taken in the first scenario and a curve 1400 was estimated to best fit the raw data for the first scenario. In the second scenario, the beam modification optical system 124 includes a beam expansion system (such as the negative wavefront curvature system discussed above, for example, the highly reflective mirror has a convex curvature). Raw data was taken in the second scenario and a curve 1450 was estimated to best fit the raw data for the second scenario. Additionally, the graph shows an aperture 1490 within the laser system 100 through which the laser beam 130 travels.

A near field laser beam profile can be said to "uniformly fill" an aperture if an intensity at an edge of the aperture is greater than some fraction of a peak intensity at a center of the aperture. In some implementations, the near field laser beam profile can be said to "uniformly fill" the aperture if the intensity at the edge of the aperture is greater than about 10% or about 20% of the peak intensity at the center of the aperture.

One can see that in the first scenario, there is a narrowing of the energy distribution across the laser beam 130 in the horizontal direction, that is, the energy distribution becomes more concentrated (in other words, the laser beam collapses) in the near field so that the near field laser beam does not fill the aperture 1490 as uniformly. In particular, the energy density indicated by the curve 1400 at an edge 1491 or 1492 of the aperture 1490 is less than about 4% of the energy density indicated by the curve 1400 at a center 1493 of the aperture 1490. Such beam narrowing is unwanted because it can lead to damage to optical components in the resonator and downstream of the resonator due to increases in the peak irradiance of, and lack of stability in the laser beam 130 to use for lithography applications.

By adding the beam expansion system (for example, the negative wavefront curvature system), the laser beam 130 exhibits a more even horizontal energy distribution (or profile) in the near-field and this reduces the potential for damage to optical components as shown in the second scenario. The beam expansion system spreads the near field energy distribution of the laser beam (that is, it keeps the near field laser beam from collapsing) so that the near field laser beam uniformly fills the aperture 1490. In particular, the intensity of the curve 1400 at the edge 1491 or 1492 is about 27% of the intensity of the curve 1400 at the center 1493 of the aperture 1490.

Other implementations are within the scope of the following claims. For example, the negative wavefront curvature system can be formed by adding a negative curvature optical device to the power ring amplifier 112 or by modifying one or more of the other optical components within the power ring amplifier 112.

What is claimed is:

1. A laser comprising:

a regenerative ring resonator comprising:

a discharge chamber having electrodes and a gain medium between the electrodes;

an optical coupler that is partially reflective so that at least a portion of a laser beam impinging on the optical coupler from the discharge chamber is reflected back through the discharge chamber and at least a portion of the laser beam impinging on the optical coupler from the discharge chamber is transmitted through the optical coupler; and a beam modification optical system in the path of the laser beam *and configured to impart a negative curvature to the wavefront of a laser beam that propagates in the regenerative ring resonator*;

wherein the beam modification optical system transversely expands a profile of the laser beam such that the near field laser beam profile uniformly fills each aperture within the laser and such that the regenerative ring resonator remains either conditionally stable or marginally unstable when operating the laser at average output powers that induce thermal lenses in optical elements inside the regenerative ring resonator.

2. The laser of claim 1, wherein the beam modification optical system is between the optical coupler and a beam turning optical element placed on a side of the discharge chamber opposite to a side facing the optical coupler.

3. The laser of claim 1, wherein the beam modification optical system is configured to cause the laser beam at the exit of the regenerative ring resonator to have the same or a larger size of the transverse beam profile than the size of the transverse beam profile of the laser beam entering the regenerative ring resonator.

[4. The laser of claim 1, wherein the beam modification optical system is configured to impart a negative curvature to the wavefront of the laser beam circulating within the regenerative ring resonator.]

5. The laser of claim [4] *1*, wherein the beam modification optical system negatively alters the curvature along a transverse direction.

6. The laser of claim [4] *1*, wherein the beam modification optical system comprises a highly reflective mirror.

7. The laser of claim 6, wherein the optical system includes the highly reflective mirror that is convex.

8. The laser of claim 7, wherein the convex highly reflective mirror has a radius of curvature of between about 50 m and about 170 m.

9. The laser of claim 1, further comprising a beam turning optical element external to the discharge chamber and in the path of the laser beam on a side of the discharge chamber that is opposite to a side that faces the optical system.

10. The laser of claim 1, wherein the regenerative ring resonator remains marginally unstable if the size of the transverse profile of the laser beam increases as the laser beam travels through a portion of the regenerative ring resonator but the laser beam transverse profile size does not exceed the transverse size of any of the optical components within the regenerative ring resonator before being decoupled out of the regenerative ring resonator through the optical coupler.

11. The laser of claim 1, wherein the beam modification optical system comprises a set of prisms.

12. The laser of claim 11, wherein the prism set comprises first, second, and third prisms configured and arranged so that the first and third prisms reduce the transverse size of the profile of the laser beam travelling along a first direction through the beam modification optical system, and the third and second prisms increase the transverse size of the profile of the laser beam travelling along a second direction through the beam modification optical system.

13. The laser of claim 12, wherein the one or more first, second, and third prisms are adjusted so that the transverse size of the profile of the laser beam travelling along the second direction through the beam modification optical system and exiting the prism set is greater than the transverse size of the profile of the laser beam travelling along the first direction from the optical coupler to the prism set.

14. The laser of claim 1, wherein the laser beam output from the regenerative ring resonator has an average irradiance of at least about 5 $W/cm^2$.

15. The laser of claim 1, wherein the laser beam output from the regenerative ring resonator has an irradiance of at least about 10 $W/cm^2$.

16. A method of modifying a laser beam of an electric discharge gas laser, the method comprising:

directing a laser beam through an optical coupler of a regenerative ring resonator;

directing the laser beam that passes through the optical coupler through a discharge chamber and back to the optical coupler such that at least some of the light impinging on the optical coupler from the discharge chamber is reflected back through the discharge chamber and at least some of the light impinging on the optical coupler from the discharge chamber is transmitted through the optical coupler; and transversely expanding a profile of the laser beam such that the near field laser beam profile uniformly fills each aperture within the laser and such that the regenerative ring resonator remains either conditionally stable or marginally unstable when operating the laser at powers that cause thermal leasing of elements within the regenerative ring resonator;

*wherein transversely expanding the profile of the laser beam includes imparting a negative curvature to the wavefront of a laser beam that propagates in the regenerative ring resonator.*

17. The method of claim 16, wherein transversely expanding the profile of the laser beam comprises:

compressing a profile of the laser beam by passing the laser beam from the optical coupler through first and third prisms of a prism set before directing the laser beam through the discharge chamber; and expanding a profile of the laser beam after it has passed through the discharge chamber by passing the laser beam through the third prism and through a second prism of the prism set before reaching the optical coupler.

18. The method of claim 17, wherein expanding the laser beam profile includes expanding the laser beam profile to a size that is larger than the profile of the laser beam input to the prism set.

19. The method of claim 16, wherein the regenerative ring resonator remains marginally unstable if the size of the transverse profile of the laser beam increases as the laser beam travels through at least a portion the regenerative ring resonator but the laser beam transverse profile size does not exceed the transverse size of any of the optical components within the regenerative ring resonator before being decoupled out of the regenerative ring resonator through the optical coupler.

[20. The method of claim 16, wherein transversely expanding the profile of the laser beam includes imparting a negative curvature to the wavefront of the laser beam circulating within the regenerative ring resonator.]

21. A regenerative ring resonator in the path of a laser beam, the resonator comprising:

a discharge chamber having electrodes and a gain medium between the electrodes;

an optical coupler that is partially reflective so that at least some of the light impinging on the optical coupler from the discharge chamber is reflected back through the discharge chamber and at least some of the light impinging on the optical coupler from the discharge chamber is transmitted through the optical coupler; and a beam modification optical system in the path of the laser beam;

wherein the beam modification optical system is configured to transversely expand a profile of the laser beam such that the near field laser beam profile uniformly fills each aperture within the resonator and such that the regenerative ring resonator remains either conditionally stable or marginally unstable when operating the laser at powers that cause thermal lensing of elements inside of the regenerative ring resonator;

*wherein the beam modification optical system is configured to impart a negative curvature to the wavefront of a laser beam propagating in the regenerative ring resonator.*

22. The resonator of claim 21, wherein the beam modification optical system is between the optical coupler and a beam turning optical element placed on a side of the discharge chamber opposite to a side facing the optical coupler.

[23. The resonator of claim 21, wherein the beam modification optical system is configured to impart a negative curvature to the wavefront of the laser beam circulating within the regenerative ring resonator.]

24. The resonator of claim [23] *21*, wherein the beam modification optical system comprises a highly reflective convex mirror.

25. The resonator of claim 21, wherein the regenerative ring resonator remains marginally unstable if the size of the transverse profile of the laser beam increases as the laser beam travels through at least a portion of the regenerative ring resonator but the laser beam transverse profile size does not exceed the transverse size of any of the optical components within the regenerative ring resonator before being decoupled out of the regenerative ring resonator through the optical coupler.

26. The resonator of claim 21, wherein the beam modification optical system comprises a set of prisms.

27. The resonator of claim 26, wherein the prism set comprises first, second, and third prisms configured and arranged so that the first and third prisms reduce the transverse size of the profile of the laser beam travelling along a first direction through the beam modification optical system, and the third and second prisms increase the transverse size of the profile of the laser beam travelling along a second direction through the beam modification optical system.

28. The resonator of claim 27, wherein the one or more first, second, and third prisms are adjusted so that the transverse size of the profile of the laser beam travelling along the second direction and exiting the prism set is greater than the transverse size of the profile of the laser beam travelling along the first direction from the optical coupler to the prism set.

29. The laser of claim 1, wherein the laser beam output from the regenerative ring resonator has an average output power of greater than 40 W.

*30. A regenerative ring resonator comprising:*

*a discharge chamber having electrodes and a gain medium between the electrodes;*

*an optical coupler that is partially reflective so that at least a portion of a laser beam impinging on the optical coupler from the discharge chamber is reflected back through the discharge chamber and at least a portion of the laser beam impinging on the optical coupler from the discharge chamber is transmitted through the optical coupler; and*

*a beam modification optical system in the path of the laser beam between the optical chamber and the optical coupler, the beam modification optical system includes a mirror that transversely expands a profile of the laser beam by negatively altering a wavefront curvature of the laser beam so that a divergence of the laser beam is increased along at least one transverse direction.*

*31. The resonator of claim 30, wherein the mirror is a highly reflective mirror.*

*32. The resonator of claim 31, wherein the highly reflective mirror is convex along the direction of transverse expansion.*

*33. The resonator of claim 31, wherein the highly reflective mirror has a surface reflectivity that is greater than 94%.*

*34. The resonator of claim 30, wherein the beam modification optical system also includes a set of prisms.*

*35. The resonator of claim 30, further comprising a beam turning optical element external to the discharge chamber and in the path of the laser beam on a side of the discharge chamber that is opposite to a side that faces the beam modification optical system.*

*36. A regenerative ring resonator comprising:*

*a discharge chamber having electrodes and a gain medium between the electrodes;*

*an optical coupler that is partially reflective so that at least a portion of a laser beam impinging on the optical coupler from the discharge chamber is reflected back through the discharge chamber and at least a portion of the laser beam impinging on the optical coupler from the discharge chamber is transmitted through the optical coupler; and*

*a beam modification optical system in the path of the laser beam between the optical chamber and the optical coupler, the beam modification optical system includes an optical component that transversely expands a profile of the laser beam by negatively altering a wavefront curvature of the laser beam so that the divergence of the laser beam is increased along at least one transverse direction;*

*wherein the profile of the laser beam is transversely expanded such that the size of the transverse profile of the laser beam increases as the laser beam travels through at least a portion of the regenerative ring resonator but the laser beam transverse profile size does not exceed the transverse size of any of the optical components within the regenerative ring resonator before being decoupled out of the regenerative ring resonator through the optical coupler.*

*37. A regenerative ring resonator comprising:*

*a discharge chamber having electrodes and a gain medium between the electrodes;*

*an optical coupler that is partially reflective so that at least a portion of a laser beam impinging on the optical coupler from the discharge chamber is reflected back through the discharge chamber and at least a portion of the laser beam impinging on the optical coupler from the discharge chamber is transmitted through the optical coupler; and*

*a beam modification optical system in the path of the laser beam between the optical chamber and the optical coupler, the beam modification optical system includes an optical component that transversely expands a profile of the laser beam by negatively altering a wavefront curvature of the laser beam so that the divergence of the laser beam is increased along at least one transverse direction;*

*wherein the size of the transverse profile of the laser beam increases as the laser beam travels through a portion of the regenerative ring resonator but the laser beam transverse profile size does not exceed the transverse size of any of the optical components within the regenerative ring resonator before being decoupled out of the regenerative ring resonator through the optical coupler.*

*38. A regenerative ring resonator of claim 37, wherein the beam modification optical system also includes:*

*a plurality of prisms arranged between the optical coupler and the discharge chamber and the plurality of prisms comprises first, second, and third prisms configured and arranged so that the first and third prisms reduce the transverse size of the profile of the laser beam travelling along a first direction through the beam modification optical system, the first direction entering the beam modification optical system, and the third and second prisms increase the transverse size of the profile of the laser beam travelling along a second direction through the beam modification optical system, the second direction exiting the beam modification optical system.*

* * * * *